COATING PRODUCT

Filed March 11, 1963

PAUL E. WELLS
JOHN S. DAVIS
RONALD E. LEE
DAVID R. BOLES
INVENTORS

BY Fraser and Bogucki
ATTORNEYS

United States Patent Office 3,292,164

Patented Dec. 13, 1966

3,292,164
COATING PRODUCT

Paul E. Wells, Los Angeles, John S. Davis, Glendale, Ronald E. Lee, Simi, and David R. Boles, Van Nuys, Calif., assignors, by mesne assignments, to The Bunker-Ramo Corporation, Stamford, Conn., a corporation of Delaware Filed Mar. 11, 1963, Ser. No. 264,127
5 Claims. (Cl. 340—174)

The present invention generally relates to coating methods and products and more particularly relates to an improved method for depositing a magnetic coating on a substrate and to an improved magnetic memory medium for use in information storage devices and the like.

The storage of information so as to make it readily usable by electrical or mechanical devices has become increasingly important. Equipment which provides such information storage in a reliable and compact manner with rapid access to the information is particularly useful and desirable in computers, data processing equipment, telephone systems, inventory accounting systems and the like. Such information usually is introduced into the memory device by associated accessory equipment and may or may not be subjected to erasure or destruction, depending upon the type of storage device.

A considerable number of information storage devices rely upon magnetic remanence to effect retention of applied information signals. Among memory storage systems which function in this manner are wire screen memory devices. Wire screen memory devices include a screen of woven filamentary members, such as conventional window screen. The screen is coated with magnetic material to provide closed electrically conductive paths encircling the openings in the screen and exhibiting a low reluctance to magnetic flux (relative to air). Electrical conductors are woven into the screen and pass to selected portions thereof. Accordingly, each screen comprises a plurality of individual memory storage elements. By applying appropriate electrical signals to selected conductors (drive wires), the magnetic material at corresponding elements can be suitably affected to store discrete bits of information. The stored information may, in turn, be detected by the same or other conductors (sensing wires) associated with the memory storage units by sensing flux changes in the magnetic materials surrounding the openings. Such wire screen memory systems provide substantially improved information storage media because of their compactness and low cost of fabrication.

However, it has been found to be relatively difficult to provide memory storage elements over substantially the entire extent of the wire memory screen with uniform magnetic properties. Such uniformity from element to element is particularly desirable in wire screen memory devices because the construction of the screen is such that it is difficult and often impossible to remove or replace defective or substandard individual memory storage elements. If there is any significant proportion of such substandard elements in a given memory screen, the entire screen may have to be discarded. Furthermore, substantial non-uniformity in magnetic properties between individual elements in a multi-element storage device makes it relatively difficult and simetimes impossible to accurately identify stored information during the readout process.

However, it is desirable to provide a simple inexpensive method of plating which affords improved control over the magnetic characteristics of the plated material. Such a plating method should be effective, when employed in the plating of wire screen memory devices, in providing substantial uniformity of magnetic characteristics over substantially the entire extent of the screen with a minimum of complexity and number of required process steps. Such a method should, if possible, have application to other substrates as well as wire screens.

Accordingly, it is a primary object of the present invention to provide an improved plated layer having predetermined magnetic properties.

It is also an object of the present invention to provide an improved wire screen plating for use in a magnetic memory storage device.

It is a further object of the present invention to provide an improved plated medium suitable for use as a magnetic storage device.

It is a more specific object of the present invention to provide an improved wire screen memory plane for a magnetic storage device.

It is still a further object of the present invention to magnetically plate a suitable substrate so as to uniformly and reproducibly impart thereto a controlled coercivity and other desired magnetic properties, including an essentially square hysteresis loop, which renders the plated product adapted for use in a magnetic memory storage device.

The present invention is particularly directed to the problems associated with the production of wire screen magnetic memory devices. In many respects, however, these problems are similar or related to those encountered in the plating of the suitable magnetic layer on other types of substrate which are employed in the fabrication of similar devices. Therefore, although for convenience of illustration the present invention will be described in the context of the production of a wire screen magnetic memory storage device, it should be understood that this is for convenience of illustration only, and that the invention is not to be thus limited but rather is intended to cover similar applications in which it may be utilized.

In brief, particular embodiments of the present invention provide for the establishimnet of a magnetic layer on a wire screen such that when the respective screen apertures are threaded by suitable drive and sense conductors, the plated wire screen is suitable for use as a magnetic storage device. In accordance with the present invention, the various parameters of the plating process are adjusted to provide a plated layer having a controlled coercive force and other desirable magnetic properties such that individual storage elements in the screen may be used for information storage.

One particular embodiment of the invention involves the plating of a conventional wire mesh screen having the usual over-and-under weave pattern. A particular configuration and structure of the wire mesh substrate enhance the desirable magnetic properties of the magnetic coating which is plated over the screen. During the plating process, the individual molecular crystals tend to become oriented in an aligned direction of easy magnetization about the individual screen apertures. This advantageous result is believed to be in part produced by an apparent tendency of such crystals to align themselves upon a curved surface in the direction of the axis of curvature thereof. Another contributing factor is believed to be the presence of surface irregularities produced along the surface of the wires when the wires are formed, due to the drawing of the wires through a forming die. Furthermore, orientation of the crystals develops in the same direction about a given screen aperture because of the fact that a closed loop is provided, resulting in a complete magnetic path.

In plating magnetic material, the crystal structure and grain size of the deposited material are extremely important. Any magnetic crystal has an easy axis of magnetization. It appears that orientation is achieved by alignment of the easy axis of magnetization of the crystals by strain. This magnetostrictive effect is probably caused by the strain induced by the lattice which results from plating cubic crystals on a curved surface. The resulting strain is sufficient to destroy the magnetic property of the layer closely adjacent the substrate. This so-called "interface" layer is believed to result from the building up of a new metallic crystal on a foreign metallic substrate. To achieve a good mechanical bond to the substrate, there must be an initial chemical bond from the magnetic material to the substrate. This initial chemical bond tends to destroy the lattice structure of the magnetic crystals being plated, and creates a layer of the metallic alloy that is nonmagnetic. In accordance with the invention, therefore, during the plating process an interface layer is built up of a magnetic material having a crystal structure which is quite similar to the crystal structure of the ultimate magnetic layer, but which has the necessary properties to achieve a successful transition from the material of the substrate to the material of the ultimate magnetic layer. In particular embodiments of the invention, the interface layer is comprised essentially of nickel which is plated to a predetermined thickness over the substrate prior to the deposition of the ultimate magnetic layer. The absolute thickness of the interface nickel layer is not important, so long as it is beyond a certain minimum thickness.

In one specific exemplary embodiment of the invention, a copper wire screen is plated initially with a relatively low melting-point metal, such as tin, and then heated so that the tin flows to provide a desired coating of the copper screen wires. This flowed tin layer advantageously serves to mask certain impurities which are present in the copper substrate; it provides a smooth surface for the nickel interface layer; and it bonds the corners of the individual cells so that the ultimate magnetic layer may be continuous and uniform about each apertured cell. The tin-plated copper screen is then overplated with a suitable metal, such as nickel, which will readily bond to the ultimate magnetic layer and which provides a relatively smooth, crack-free interface layer. The final magnetic plating operation can be carried out, for example, by a vapor deposition, electroless plating, electrolytic plating or the like, to a controlled plating thickness at a rate of deposition to achieve a controlled coercive force and squareness of the "bulk" hysteresis loop of the material. The "bulk" hysteresis loop is the hysteresis loop of an entire memory plane when tested in one mode uniformly, and is to be distinguished from the hysteresis loop of an individual memory element or storage cell within the plane. A wire screen memory plane fabricated in the manner described may then be threaded in a preselected pattern with appropriate drive and sense leads which are utilized to operate the structure as a magnetic storage device.

In another specific embodiment of the invention, the drive and sense leads are woven into the screen at the same time that the screen is fabricated. Plating of successive layers proceeds substantially in the manner already described, except that care is taken to provide for the selective plating of the structure so that the magnetic layer adheres to the mesh portion of the screen without being deposited on the interwoven drive and sense leads.

A better understanding of the invention may be had from a consideration of the following detailed description, taken in conjunction with the accompanying drawing, in which.

Referring more particularly to the present invention, a magnetic plating is applied in an improved manner to a suitable substrate under controlled conditions, including control of plating thickness, so that the plating exhibits uniformly controlled coercivity and a substantially square bulk hysteresis loop. The magnetic plating is applied to a small curved, preferably circular (in cross section) substrate surface, such as a wire or a plurality of interconnected wires, e.g. a woven mesh screen. A schematic flow diagram for fabricating a preferred embodiment of the present invention is set forth in FIG. 1. According to that embodiment, the substrate is subjected to a plurality of steps which prepare the surface thereof for the deposition of a magnetic plating.

Figures 2, 3:
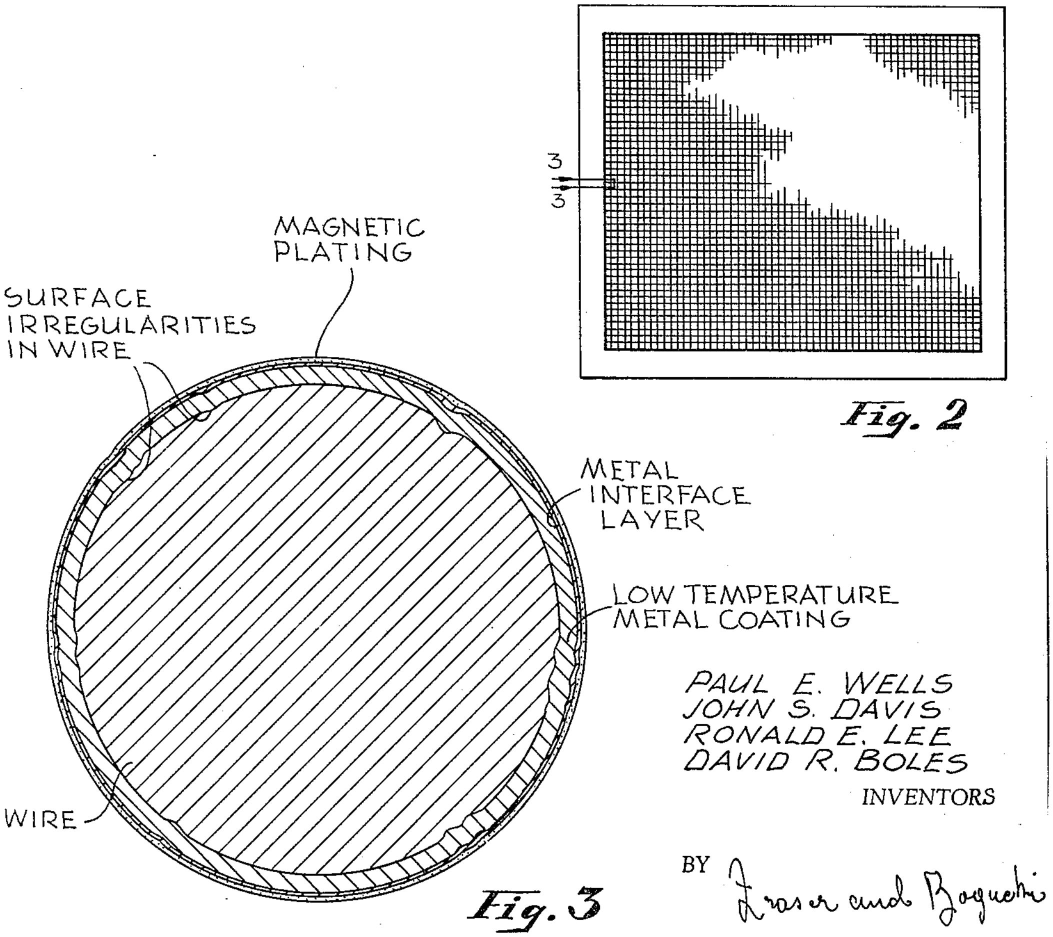
FIG. 2 is a schematic plan view of a magnetically plated wire screen memory plane; and, FIG. 3 is a sectional view taken along the line 3—3 of FIG. 2.

The substrate may comprise, for example, a wire screen, such as that schematically illustrated in plan view in FIG. 2. The screen may be machine or hand woven to form a memory plane and may be of, for example, the conventional 20, 30 or 40 mesh window screen size. The screen can be fabricated of any suitable electrically conductive substance, for example, a metal such as aluminum, silver, nickel or tin or an alloy of like metals. However, it has been found that, for most purposes, copper is both economical and suitable. In any event, the screen must be capable of withstanding subsequent treatment, such as high temperature annealing for example, without substantial deterioration thereof. It has been found possible to employ essentially electrically non-conductive wire media such as plastic screens, fabricated of, for example, relatively high temperature plastics, such as polytetrafluoroethylene plastic known under the U.S. registered trademark of Teflon, and manufactured by E. I. du Pont de Nemours & Company of Wilmington, Delaware. Alternatively, the wire of the screen can be fabricated for example, of a suitable metal or alloy which has been jacketed in a suitable high temperature ceramic or plastic insulator, such as Teflon. In any event, if such ceramic or plastic substance is utilized as the base wire or as an insulator over metal wire, it may be necessary to suitably treat the surface thereof, as by etching or the like, so that such surface is readily capable of receiving and bonding with metal or alloy applied thereto. Such etching can be accomplished in accordance with known techniques and need not be described in detail.

Since there is some evidence that the nature of the base wire or base surface has an effect on the magnetic properties of the finished memory plane, it is preferred for most purposes to utilize a memory plane in which the base material or metallic layer is copper, nickel, a copper alloy or a nickel alloy. It will be appreciated that the memory plane can be of any desired size and that wire screens are particularly adaptable to preparation in a continuous operation to finished memory planes.

It will also be appreciated that the substrate need not be in the form of a woven screen, but that such form is preferred. However, each unit of the substrate should be small in cross section and curved so that the radius of curvature thereof effects magnetic orientation of the finished plating disposed thereon, as more particularly described hereafter. Preferably, the components of the substrate are substantially circular in cross section.

Drive and sense wires can be woven into the apertures of the base screen for the purpose of controlling the storage and readout of information in the finished screen. Such weaving can take place before pretreatment and magnetic plating of the screen, or can be done after the final plating of the screen. The drive and sense wires may comprise, for example, copper or nickel wire suitably insulated from the screen by an electrical insulator such as high temperature plastic, e.g. Teflon, ML or ceramic. Suitable ceramics are available which are heat stable to above 1000° C. and which bond well with metallic wire and are sufficiently flexible.

The wire screen or other suitable base or substrate of the memory plane is preferably treated to mask any impurities in the metal, plastic, ceramic or electrical insulator composite metal material thereof which would adversely affect the magnetic properties of the finished product. A masking coating may be provided which has a sufficiently low melting point that it can be flowed on the substrate in a controlled manner to effectively bond all exposed corners thereof. This is preferred, particularly where a wire screen is the substrate. It will be readily understood that where the screen wires loop over and under each other, they are not generally bonded together. However, for the purposes of the present invention, it is necessary that the corners be physically bonded so that each aperture in the screen is bounded by a closed magnetic path and can function adequately as a memory storage unit.

Figure 1:
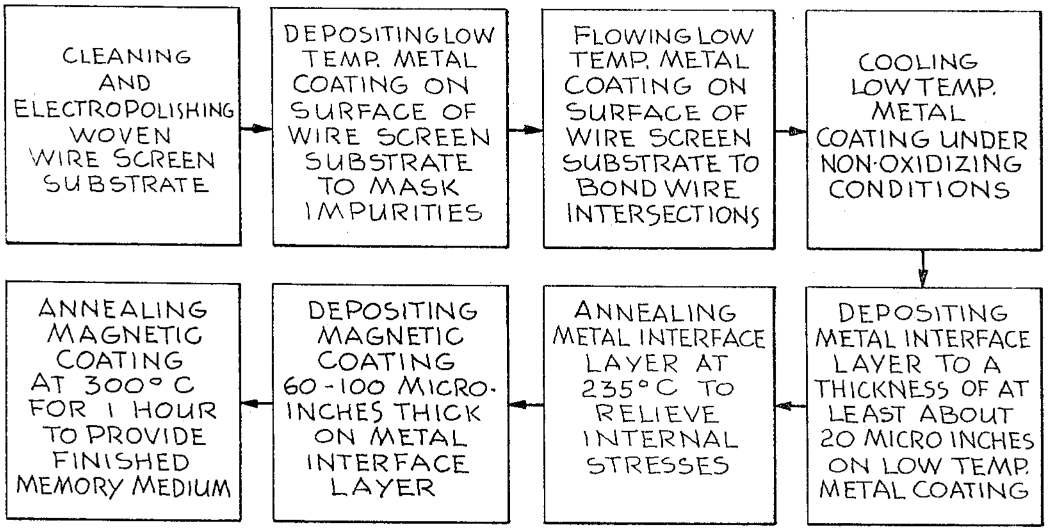
FIGURE 1 is a schematic flow diagram for forming a magnetic plating on a suitable substrate, such as a wire screen, to provide an improved magnetic memory plane in accordance with the present invention.

For this purpose, in accordance with a preferred embodiment of the invention, such as is schematically illustrated in the flow diagram of FIG. 1 of the accompanying drawings, a relatively low melting point, relatively pure metal is deposited as a coating on the substrate. As an example, copper screening material can be masked and overlaid with a suitable lower melting point metal, such as tin, by any siutable means, preferably an electrolytic plating operation.

However, before any such protective plating is applied to the substrate, it is desirable to remove most surface imperfections and impurities from the base wire. This can be readily accomplished by conventional cleaning and electropolishing steps. Commercially available copper wire has a substantial number of surface imperfections, including furrows and grooves therein due to the dies used in the drawing operations carried out in forming the copper wire from which the screen is made. Moreover, commercial weaving operations usually strain the wire, particularly at the knuckles or corners, i.e. the areas where the wires cross over each other. Minute cracks in the surface of the wire at the knuckles usually can be detected and are undesirable. It has been found that through an electropolishing operation, shallow longitudinal surface grooves in the wire can be reduced in size and minute cracks can be eliminated. It is desired that some shallow longitudinal grooves or valleys be retained in the wire until the magnetic plating step, since it has been found that such grooves aid in magnetically orienting the crystals of the plating.

During or after commercial drawing operations on screen wire, the wire is usually coated with a thin, protective lubricating coating of oil, wax, or the like. This protective coating should be removed in order to facilitate adequate bonding of the coating of low temperature metal or alloy or metal-containing material to the surface of the wire. Such oil, wax or the like can be readily removed by the use of a suitable organic solvent, such as trichloroethylene or perchloroethylene, as by immersing the screen in the solvent and agitating the same therein. The cleaned wire is then dried and electropolished in accordance with conventional procedure. A typical electropolishing solution may be used, the constituents varying depending upon the metal being electropolished. The usual electropolishing solution (electrolyte) contains a relatively high concentration of strong mineral acid, such as phosphoric acid in the case of copper electropolishing.

After the cleaning and electropolishing, deposition of the impurity-masking coating on the substrate is carried out. For example, when a copper screen substrate is utilized, tin is suitable for a masking coating. The tin or other suitable low melting point metal, for example, lead, antimony or alloys thereof depending upon the melting point of the substrate and insulation of insulated wire in completely woven screens can be applied to the screen by any suitable metal deposition procedure, for example, vapor deposition, spraying, metal dipping, electrolytic plating or electroless plating, depending upon the particular metal being deposited.

As an example, tin may be plated on a copper wire screen in an electrolytic plating operation. In the plating operation, the cleaned copper wire memory plane is introduced into a suitable tin plating bath (electrolyte), that comprises, for example, sodium or potassium stannate. The bath also includes a strong alkaline metal hydroxide, for example, potassium hydroxide. Tin anodes of high purity are disposed in the electrolytic plating bath and are connected through an external electrical circuit with the wire memory plane which acts as the cathode. A potential source applies current to the arrangement and the tin dissolves into the bath from the anodes and is plated out on the wire screen. It is important to carefully control the procedure so that during such step stannous ions are converted to stannate ions and so that the stannate ions are predominant in the solution. A typical tin plating bath comprises the following:

TABLE I

| Constituents: | Concentration in electrolyte |
|---|---|
| Sodium stannate, oz. per gallon | 14 |
| Potassium hydroxide, oz. per gallon | 1.5 |
| Water, pints per gallon | 7 |
| OPERATING CONDITIONS | |
| Bath temperature, ° C. | 65 |
| Voltage, volts | 4.5–6 |
| Cathode current density, amp. per sq. ft. | 6–30 |

The tin plating bath may be disposed in any suitable container such as a glass tank or the like. It is desirable to carry out the plating step until the tin is plated out to a suitable thickness, for example, slightly less than 0.5 mil (.0005 inch) on the substrate. The desired thickness depends on the wire diameter of the substrate and the size of the fillets or corner bonds desired. The tin anodes must be properly activated to ensure that the tin is dissolving as stannate ions. The tin anodes are properly activated when they are covered with a yellowish-green film. However, when this film is lost or fails to form, poor deposition of tin on the surface of the cathode wire screen occurs. If the film on the tin anode is black or brown, the anode is passive and tin is not dissolving at all.

The proper film on the anode is formed by increasing initially the current density and then subsequently reducing the voltage until the current is set to the proper level. If there is an excess of stannous ions, the solution has a relatively dark color. A suitable oxidizing agent, such as hydrogen peroxide, may then be added to the solution to oxidize the excess stannous ions to stannate ions. The deposition of tin on the surface of the copper can be controlled by reference to the color of the plated tin, a white precipitate forming if the tin is not plating out properly, by reference to the surface film on the anodes, and by the behavior of the bath current during plating. The deposited color of the stannate tin is matte white. The tin plated surface should be even, not rough. The current should increase to a very high value and then decrease in approximately 30 seconds after the anodes are activated. The current then decreases to a minimum value and finally increases as the plating time is continued.

Thus, the substrate can be effectively sealed to prevent adverse effects upon the magnetic properties of the subsequently applied magnetic plating from impurities in the substrate.

As a further step in the preferred method of the present invention, as set forth in FIG. 1, the tin is then flowed over the surface of the substrate, particularly where the substrate is a wire screen, to bond the corners of the screen apertures, i.e. the areas where the screen wires overlap each other. One way to cause the tin to flow is to heat the screen to above the melting point of the tin coating in an oil or molten wax bath. The bath serves to protect the molten coating from oxidation. Palm oil, hydrogenated vegetable oil, fish oil, mineral oil or the like can be used as the bath. A commercial mixture of hydrogenated fatty acid and glyceride having a flash point of about 585° F. and a fire point of 655° F. has been successfully employed. Alternatively, the tin or other low melting point coating on the screen may be heated to above its flow point in a furnace containing an inert atmosphere, for example, helium, hydrogen, etc.

When the tin or equivalent coating on the screen is heated to above the flow point thereof, it tends to migrate into the indicated corners and to effectively cover the entire substrate and bond together the intersecting wires forming the corners. Such migration is in part due to the surface tension of the molten metal. This step is controlled so as not to strip the wire between the corners or intersections of the protective metal coating. Thus, it is preferred to terminate this step when the thickness of the tin between the corners is reduced to for example, below about 300 microinches. For example, when an initial tin coating of about 0.5 mil thickness suitable with 16 ml. diameter wire screen substrate has been flowed, the tin will have built up in the corners to about a mil or so in thickness. The molten coating is then quenched under non-oxidizing conditions. Such quenching can be conveniently carried out, where an oil or wax bath is used in the heating step, by removing the screen from the bath and immersing the screen in a suitable organic solvent for the constituents of the bath, such as trichloroethylene, so as to protect, quench and clean the screen in one operation.

The bonded substrate may then be treated to provide a suitable magnetic coating or plating thereon. However, in order to assure a good mechanical bond of the magnetic plating to the substrate, and also to prevent any depreciation of magnetic properties in the magnetic plating during bonding to the substrate, it is preferred to dispose over the tin or equivalent coating on the substrate an interface layer or plating of a metal or alloy or metallic metal-containing material which forms a superior mechanical bond both with the tin and also with the subsequently deposited magnetic plating so as to provide a unitary structure. Moreover, the interface layer is preferably composed of one or more metallic components of the magnetic plating for maximum compatibility therewith. Thus, with such an interface layer present, the magnetic plating is not required to be directly bonded to a foreign metal such as tin but instead bonds to a metal or alloy also present in the magnetic plating. The interface layer may comprise a suitable material which contains nickel, iron, cobalt or an alloy thereof, particularly in major proportion. Nickel, iron and cobalt all have approximately equal atomic radii. However, for most purposes, nickel or a nickel alloy is preferred. If the interface layer is eliminated, the magnetic plating should be relatively thick so that a portion thereof itself acts as an interface bonding layer. However, when such a relatively thick magnetic plating is deposited, it tends to internally stress and rupture, so that the inclusion of an interface layer as described is preferred.

The desired interface layer should be sufficiently thick to provide the desired transition from the substrate to the magnetic plating. For most purposes, such an interface layer should be at least about 50 microinches in thickness. However, this figure may be reduced to, for example, about 20 microinches, if subsequent to deposition of the interface layer a heat treating operation, such as annealing, is carried out at any suitable temperature (about 250° C. in the case of nickel) so as to relieve internal stresses in the interface layer. Such annealing can only be used if the underlying coated or uncoated substrate is capable of withstanding the high temperature treatment. The interface layer may be any suitable thickness beyond the indicated minimum but less than a thickness which would, due to internal stress, result in rupturing of the interface layer. Thus, the finished interface layer should be substantially crack-free, that is, essentially non-porous. The interface layer can be deposited on the coating surface of the substrate by any suitable technique which does not adversely affect any coating on the substrate. However, it is preferred to deposit a nickel interface layer by an electrolytic plating technique.

As an example of a typical successful electrolytic nickel plating technique, a tin plated copper screen was immersed in an electrolytic plating bath containing 65 grams of ammonium citrate, 50 grams of ammonium chloride and 30 grams of nickel chloride per liter of distilled water. A plurality of nickel anodes of high purity were also immersed in the bath. Using the screen as the cathode, a nickel plating was built up on the surface of the tin to a thickness of about 50 microinches, and thereafter the screen was removed from the bath, washed with water and dried. It is important in carrying out the electrolytic deposition of the interface layer that the current density applied be very close to the same current density that is to be used when plating the magnetic layer, in order to assure compatible properties between the interface layer and magnetic layer.

It will be understood that, depending upon the nature of the substrate, the low temperature metal coating may be dispensed with in some instances and the interface layer can be used as the impurity-masking layer of the substrate.

Deposition of the magnetic coating is then carried out in a manner to provide a product having a bulk hysteresis loop with a very square knee and controlled coercivity. Such deposition can be carried out by an electrolytic plating technique, an electroless plating technique, vapor deposition or any other suitable procedure which results in a finished plating or coating of carefully controlled thickness and selected magnetic properties.

Although the magnetic coating may be deposited on the substrate in any suitable manner, it is preferred to employ an electroplating technique. Moreover, it is preferred to electroplate either a plating containing iron and nickel or a plating containing iron, nickel and cobalt, with or without non-metals such as phosphorus and carbon. One such three-element plating contains about 50 parts of nickel to about 25 parts of iron and about 25 parts of cobalt.

As an example, an alloy containing about 39 parts of iron to about 61 parts of nickel can be electroplated on a prewoven 20 mesh copper wire screen containing 8 mil radius wire which has been plated with a 0.5 mil thick layer of tin and overplated with a 50 microinch thickness of nickel. The electrolyte for plating the magnetic alloy layer comprises the following:

TABLE II

| Constituents: | Concentration (per liter of water solution) |
|---|---|
| Saccharin, gram | .83 |
| Sodium lauryl sulfate, gram | .42 |
| Boric acid, grams | 2.5 |
| Sodium chloride, grams | 9.7 |
| Nickel sulfate, grams | 218.1 |
| Ferrous sulfate, grams | 14.4 |

OPERATING CONDITIONS

| | |
|---|---|
| pH | 2.7 |
| Plating, min. | 60 |
| Current, ma./cm.² | 1 |
| Temperature, ° C. | 25 |

A plurality of anodes are placed in the electrolyte. The screen is suspended vertically in the electrolyte and the anodes are spaced therefrom. The anodes are tilted slightly towards the screen so that the tops of the anodes are closer to the screen than are the bottoms of the anodes. This is to compensate for the increasing concentration of generated hydrogen gas bubbles from the bottom to the top of the screen (cathode) adjacent the surface of the screen. Such bubbles have the effect of partially interfering with ion migration to and metal deposition on the surface of the screen.

It has been found that for the particular material being electrolytically plated, there is a suitable electrolyte pH range of from about 2.6 to about 3.0, with a pH in the range of 2.7 to 2.8 being preferred. Within this pH range, the bulk hysteresis loop is the squarest and therefore the best for magnetic storage purposes. The current density, and therefore the rate of deposition of the magnetic plating should be sufficiently low to provide highly magnetically oriented crystal formation. Electroplating utilizing the indicated electrolyte is very efficient at about 1 ma. per cm.$^2$ current density. The plating has a coercivity of about 1.8–2 oersteds and a very square hysteresis loop. While higher current densities may appear to produce satisfactory screen memory devices initially, it has been found that these devices lose the property of magnetic remanence with time and thus do not age as well as screens plated at about 1 ma. per cm.$^2$.

It has been found that the tilt of the bulk hysteresis loop increases with the thickness of the magnetic plating deposited. For most purposes, it is preferred to provide a thickness for the magnetic coating of between about 60 and about 100 microinches. When the thickness of the magnetic coating increases substantially over about 100 microinches, the hysteresis loop begins to depart rapidly from the optimum square form. For the indicated electroplating system, a plating time of about 75 minutes at 1 ma. per cm.$^2$ current density provides the plating with a preferred hysteresis loop, a plating thickness of about 60 microinches and a coercivity of 1.8–2 oersteds. During the electroplating, the magnetic coating firmly bonds to the interface layer so that a durable unitary structure suitable for use in magnetic memory storage devices is provided.

After the magnetic coating or plating has been deposited in accordance with the foregoing, the initially hard coating may be heat treated at a temperature of approximately 235° C. for about 1 hour. Such heat treatment may be optional, but is preferred for optimum magnetic properties of the finished device. Heat treating in the range of from about 100° C. to about 235° C. can be employed.

The following examples further illustrate certain features of the present invention:

*Example I*

A 20 mesh, commercially extruded, woven copper wire screen of 5.5 x 5.5 inch size and having an average wire diameter of about 16 mils was cleaned in trichloroethylene for 2 minutes under agitation, then removed, dried and electropolished in a phosphoric acid-containing electropolishing solution at an operating voltage of 5 volts and a temperature of 25° C.

The copper screen was removed from the electropolishing solution, washed with water, and then dried. It was then electroplated with tin at a temperature of 65° C., utilizing a voltage of 4.5 to 6 volts and a cathode current density of 6 amps per square foot. The screen served as the cathode, interconnected through an external circuit with pure tin anodes. The electrolyte comprised the following:

TABLE III

| Constituents: | Concentration, oz. per gallon of distilled water |
|---|---|
| Sodium stannate | 14 |
| Potassium hydroxide | 1.5 |

A total of 5 gallons of the bath solution was utilized. During the electroplating, the voltage was regulated so as to provide essentially only stannate ions. There was no necessity of oxidizing stannous ions to stannate ions during the operation.

The tin-coated copper wire mesh screen was then removed from the tin electroplating bath, washed free of electrolyte, dried and immersed in a bath containing a commercial mixture of fatty acid and glycerides. In this bath, the screen was heated gradually to a temperature of about 460° F. The screen was kept in the bath until the tin thereon had melted and had flowed to provide a tin plating at the corners or intersections of the wires of the screen of about 1 mil in thickness. The tin plating between the intersections had been reduced to about 200 microinches in thickness.

The wire screen was then removed from the fatty acid-containing bath and immersed in trichloroethylene maintained at about 25° C. temperature. The trichloroethylene had the effect of both quenching and cleaning the tin, while protecting the tin from oxidation. The screen was held in the trichloroethylene until the tin had solidified and cooled below the oxidation point, after which the screen was removed from the trichloroethylene, dried and subjected to electrolytic nickel deposition by total immersion in an electrolytic nickel solution comprising the following:

TABLE IV

| Constituents: | Concentration, grams per liter of water |
|---|---|
| Ammonium citrate | 65 |
| Ammonium chloride | 50 |
| Nickel chloride | 30 |
| pH adjusted to 9.0 with ammonium hydroxide. | |

A nickel anode was also introduced into the nickel solution. The electrolytic plating was allowed to proceed until a nickel plating had been deposited over the tin which was approximately 50 microinches in thickness at a current density of 1 ma./cw.$^2$. The nickel plating was uniform and smooth. Thereafter, the nickel plated wire screen was removed from the electrolytic plating solution, washed free of the electrolytic plating solution and dried.

The nickel plate wire screen was then subjected to an electrolytic magnetic plating operation, utilizing the following solution as the electrolyte:

TABLE V

| Constituents: | Concentrations (per liter of water solution), grams |
|---|---|
| Saccharin | .83 |
| Sodium lauryl sulfate | .42 |
| Boric acid | 2.5 |
| Sodium chloride | 9.7 |
| Nickel sulfate | 218.1 |
| Ferrous sulfate | 7.2 |
| Colbalt sulfate | 7.2 |

A plurality of nickel anodes were employed. The screen served as the cathode and was suspended vertically in electrolyte. The pH of the electrolyte was 2.7. The anodes were tilted slightly towards the cathode so that the top of each anode was closer to the surface of the screen than was the bottom of each anode for the reason already mentioned. The cathode and the anodes were electrically interconnected through an external circuit, through which current was applied at a density of about 1 ma. per cm.$^2$. The electroplating was carried on for a period of about 75 minutes until a thickness of approximately 60 microinches of a magnetic alloy was deposited. The plating comprised about 50 percent nickel, 25 percent iron and 25 percent cobalt and was uniformly deposited upon the nickel surface of the screen. Thereafter the magnetic alloy plated screen was removed from the electrolyte, washed free of electrolyte and was dried. The screen was then heat treated for 1 hour at 235° C., and then cooled to room temperature. The plated magnetic screen was then ready for threading with drive and sense wires in preparation for use as a memory plane in a magnetic data storage device.

The finished memory plane was threaded with insulated drive and sensing wires and then tested for its magnetic properties. It was found to have a coercivity of about 1.8 oersteds. The bulk hysteresis loop of the plane was upright (untilted) and square with a very square knee, indicating maximum magnetic orientation of the plated crystals. The plane thus possessed the desired magnetic properties which rendered it highly suitable for use as a magnetic memory storage medium.

*Example II*

Fabrication of an improved magnetic memory plane from wire mesh screen was carried out essentially as set forth in Example I, except that for the final plating operation a magnetic alloy was deposited which comprised approximately 61 percent, by weight, of nickel and 39 percent, by weight, of iron.

The alloy was deposited during an electroplating operation utilizing the following electrolyte:

TABLE VI

| Constituents: | Concentrations (per liter of water solution), grams |
|---|---|
| Saccharin | .83 |
| Sodium lauryl sulfate | .42 |
| Boric acid | 2.5 |
| Sodium chloride | 9.7 |
| Nickel sulfate | 218.1 |
| Ferrous sulfate | 14.4 |

The electroplating was carried out utilizing anodes having essentially the same composition as the magnetic plating. Other parameters were: electrolyte pH of about 2.8 and temperature of 25° C., a current density of about 1 ma. per $cm.^2$ and an electroplating time of about 60 minutes. A magnetic alloy plating having a thickness of about 60 microinches was provided thereby. The magnetic plating was smooth and uniform, and had a coercivity of 2 oersteds and a square upright bulk hysteresis loop with a very square knee. The finished wire screen was found to be suitable for use as a memory plane for a magnetic storage device.

It has been found that a wire screen magnetic memory device produced in the manner described above possesses particularly desirable magnetic properties which render it suitable for information storage purposes. The magnetic properties demonstrated by such a device exceed those which might be expected from a study of results obtained by plating or depositing magnetic layers on other types of substrate, as in so-called magnetic thin film planes or the like. The unexpectedly good magnetic properties provided by the present invention appear to result from a number of factors, among which are the particular geometrical and structural configurations of the wire screen substrate.

It is further believed, although the present invention is not limited thereto, that directionally oriented surface irregularities in the substrate, e.g. the small longitudinally extending grooves in the wire, play a significant role in making the coating magnetic. Thus, the hills or crests between such grooves may act as foci for crystal or magnetic domain orientation during the deposition of the metal or alloy and so provide alignment along the easy axis of magnetic orientation. Highly magnetically oriented platings have been obtained by plating on striated wire. This suggests that the initial crystal formations may start on the high points in the surface and that the grain size is controlled to a degree by the smoothness of the substrate. On an almost perfectly smooth surface, however, the initial ion deposition is probably in a random pattern at uniform distances apart, rather than in an oriented manner. At a relatively slow deposition rate (low current densities in the case of electrolytic plating), the ions appear to deposit in an oriented manner. However, at rapid deposition rates, the crystal formations and grain size are likely to be in a random manner and independent of surface imperfections. Accordingly, orientation of the magnetic domains and the size of the magnetic domains can be somewhat controlled by selectively determining the surface finish and the deposition rate (current density for electrolytic plating).

It is believed that the deposition of the magnetic layer on the curved surface of the individual wires leads to a distortion of the essentially cubic or hexagonal crystals being deposited which results in an orientation with the easy axis of magnetization substantially aligned along the length of the wire. This orientation or alignment is apparently enhanced by the presence of surface irregularities which are similarly aligned, these irregularities being in large measure produced as the wire is drawn through a die during fabrication. The magnetic orientation along the individual wires is further enhanced by the individual element configuration of the screen, with each screen aperture defining a closed magnetic loop. Thus, for a substantially orthogonal screen structure, the crystal orientation and corresponding magnetic moment along each of the four wires surrounding a single aperture reinforce, and are reinforced by, the crystal alignment along the other three sides. Accordingly, the plating of a magnetic coating on a curved surface, particularly one having a small radius of curvature, and the plating of a magnetic coating on a screen configuration are important features of the present invention.

Aspects of the present invention may be particularly adaptable to other curved structures which are not necessarily arranged in a screen or mesh configuration. For example, during the bonding of crystals of iron, nickel or cobalt to a highly curved surface, either gaps will tend to occur between the crystals or the crystals must become distorted out of their normal crystalline configuration, producing a lattice strain which develops a magnetostrictive effect in the deposit. It is known that a material becomes magnetic if the ratio of the atomic separation to the radius of the shell containing the excess positive spin electrons is greater than 1.5. It is also known that a magnetostrictive material can be deformed and a voltage can be measured at right angles to the direction of deformation. Accordingly, magnetic and electrical properties can be affected during crystallization and crystal deformation. Thus, the substrate being magnetically coated in accordance with the present invention is one which has a surface with a sufficiently small radius of curvature to produce magnetic orientation of the domains or crystals of the coating.

It has further been found that during the deposition of the magnetic coating there are several regions of desired or optimum thickness for such coating, i.e. in which the magnetic properties are optimal. As the thickness of the coating increases beyond such regions, magnetic properties depreciate. This may be due to adverse straining of the crystal lattice bonds or perhaps random crystal deposition. Accordingly, control of the thickness of the coating being laid down and the current density during plating is essential to provide optimal magnetic characteristics.

As has been clearly illustrated in the above description and Examples I and II, an improved, simple and inexpensive method is provided in accordance with the invention for depositing a magnetic coating on a suitable substrate. The magnetic properties of the coating can be controlled so that the coating has low coercivity and a square bulk hysteresis loop and, accordingly, is suitable for use as an improved magnetic memory medium in a magnetic storage device. The present invention extends to the production of unitary structures incorporating such improved magnetic coatings, and to the structures themselves which are thus produced.

Although different arrangements of providing an improved magnetic storage apparatus in accordance with the invention have been disclosed in order to demonstrate preferred embodiments thereof, these are by way of illustration only and the invention is not to be limited thereto. Accordingly, any and all modifications, variations and equivalent arrangements of equipment and products falling within the scope of the appended claims should be considered a part of the present invention.

What is claimed is:

1. An improved magnetic memory medium, which medium comprises:

a magnetic coating containing metal selected from the group consisting of iron, cobalt, nickel and mixtures thereof bonded to a substrate comprising a curved surface having sufficiently small radius of curvature such that the crystals of said magnetic coating are magnetically oriented thereby, said coating having a thickness of between about 60 and about 100 microinches and exhibiting a substantially square bulk hysteresis loop and a coercivity in excess of about 1.8 oersteds.

2. An improved magnetic memory plane comprising: a magnetic plating including metal selected from the group consisting of iron, cobalt, nickel and mixtures thereof deposited to a thickness of between about 60 and 100 microinches on a curved surface having a sufficiently small radius of curvature such that crystals of said magnetic plating are magnetically oriented thereby, said surface containing a plurality of surface irregularities which facilitate magnetic orientation of said crystals, said plating having a substantially square bulk hysteresis loop and a coercivity in excess of about 1.8 oersteds.

3. An improved magnetic memory plane comprising:
a wire screen and a magnetic plating deposited thereon,
said magnetic plating including metal selected from the group consisting of iron, cobalt, nickel and mixtures thereof,
said magnetic plating having a thickness of between about 60 and 100 microinches, a substantially square bulk hysteresis loop and a coercivity of at least about 1.8 oersteds,
the wires of said wire screen having sufficiently small radii of curvature such that crystals of said magnetic plating are magnetically oriented thereby, and
said wires being woven in a configuration providing a plurality of closed loops to facilitate the magnetic orientation of the magnetic plating around the individual loops.

4. An improved magnetic memory plane which comprises:
a metallic substrate,
a coating of a metal having a melting point below the melting point of said substrate bonded directly to said substrate and flowed along the surface thereof, an essentially nonporous interface layer containing metal selected from the group consisting of nickel, cobalt, iron and mixtures thereof and having a thickness of at least about 50 microinches, said interface layer being bonded to the surface of said metal coating, and
a magnetic coating containing metal selected from the group consisting of iron, cobalt, nickel and mixtures thereof in a thickness of between about 60 and 100 microinches bonded to said interface layer, said magnetic coating having an essentially square bulk hysteresis loop and a coercivity in excess of about 1.8 oersteds, and said substrate having a curved surface with a sufficiently small radius of curvature such that crystals of said magnetic coating are magnetically oriented thereby.

5. An improved magnetic memory plane comprising:
a copper wire screen substrate,
a coating of tin bonded to the surface of said substrate and joining the wires of said screen at said intersections, to provide said screen with a plurality of closed loop storage elements,
an essentially nonporous interface layer comprising nickel bonded to the surface of said tin coating and having a thickness of at least about 50 microinches, and
a heat treated magnetic plating bonded to the surface of said interface layer and having a thickness between about 60 and 100 microinches, an essentially square bulk hysteresis loop and a coercivity in excess of about 1.8 oersteds,
said magnetic plating comprising magnetic nickel alloy,
the wires of said screen having sufficiently small radii of curvature such that crystals of said magnetic plating are magnetically oriented thereby, and
said wires having a plurality of longitudinally extending surface grooves which facilitate magnetic orientation of said crystals.

No references cited.

BERNARD KONICK, *Primary Examiner.*

G. LIEBERSTEIN, *Assistant Examiner.*